May 13, 1924.
L. R. BROWN
1,493,956
MATRIX MAKING DEVICE
Filed Feb. 15, 1923
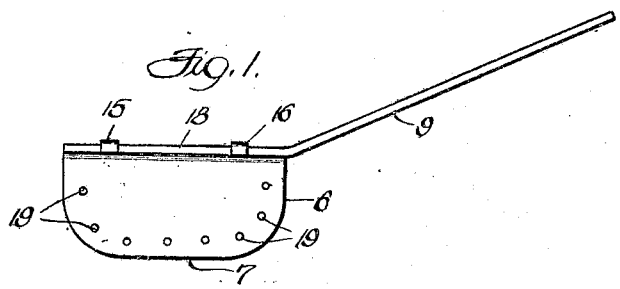
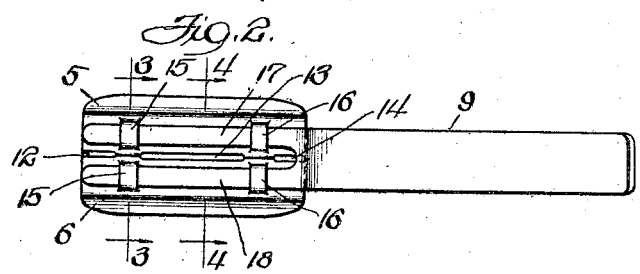
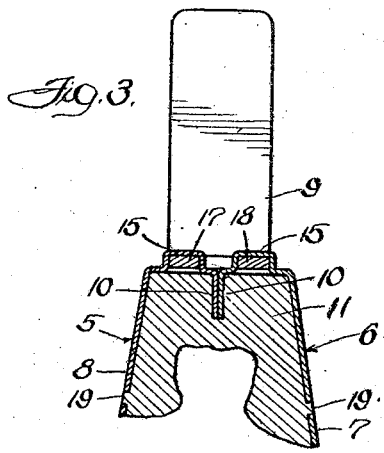
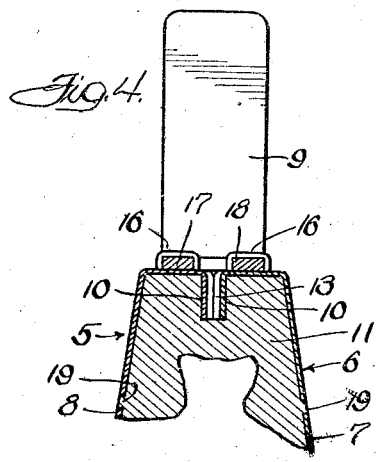
Inventor:
LEANDER R. BROWN Patented May 13, 1924.

1,493,956

UNITED STATES PATENT OFFICE.

LEANDER R. BROWN, OF CHICAGO, ILLINOIS.

MATRIX-MAKING DEVICE.

Application filed February 15, 1923. Serial No. 619,230.

*To all whom it may concern:*

Be it known that I, LEANDER R. BROWN, a citizen of the United States, residing at Chicago, in the county of Cook and State of Illinois, have invented certain new and useful Improvements in Matrix-Making Devices, of which the following is a specification.

This invention relates to matrix making devices.

One of the objects of the invention is to make an improved matrix forming device in two pieces which may conveniently be separated to remove it as a whole from the enclosed object.

Another object is generally to improve devices of this character and particularly with respect to means for holding the matrix members together.

A further object is to provide a device of this character especially adapted for use by dentists, which is convenient for making matrices or taking impressions of bicuspid and molar teeth of the jaw.

Other and further objects and advantages will readily appear to persons skilled in the art from a consideration of the following description when taken in conjunction with the drawing, wherein:—

Fig. 1 is a side elevation of the device.

Fig. 2 is a plan view.

Fig. 3 is an enlarged section taken on line 3—3 of Fig. 2.

Fig. 4 is a section on line 4—4 of Fig. 2.

In all the views the same reference characters are employed to indicate similar parts.

In making matrices of teeth and other formations of the rear part of the jaw it is essential that the holders for the plastic material in which the matrix is formed shall be separable after the formation of the matrix.

In my present invention there are two like members primarily held together by a handle and the handle is easily removed from its holding position after the plastic material has set by gently moving it forwardly from the mouth.

For the purpose of making a clean clear break of the plastic material without interfering with its intended use, the plastic is partially separated or attenuated, in a plane between the holding members, while it is soft, by inserting a knife blade, or like instrument therein in a manner hereinafter to be explained.

The plastic holding members 5 and 6 are substantially duplicate in form; for convenience of use, I prefer to make the skirt 7 of the member 6 a trifle longer than the skirt 8 of the member 5. The member 5, being in this respect smaller than the member 6, is better adapted for placement inside of the jaw. By reversing the position of the handle 9 with respect to the assembled members 5 and 6, the shorter member 5 may be placed inside of the jaw on the right or on the left side of the mouth.

Each member 5 and 6 has a downturned flange part 10 that is parallel and face to face when the members are in place, as shown in Fig. 3. The flanges also serve as separators to some extent for the plastic material 11.

There are openings 12, 13 and 14 between the members where the flanges are removed, and these slits are left within which to insert a knife blade, or similar instrument, into the plastic material before it sets or becomes hard, to weaken it, thereby to determine the parting line and to render separation of the members 5 and 6 less difficult.

Two loops 15 and 16, of the sheet metal of which the members 5 and 6 are made, are pushed out to provide staple-like holding members to receive the separated parallel prongs 17 and 18 of the handle 9. It is apparent that the prongs may be inserted from either end of the assembled members 5 and 6. Openings 19 are made thru the skirts 7 and 8 at intervals thru which the plastic 11, while in its soft state, will key to hold the plastic within the assembled members 5 and 6. After these members have been separated the flanges 10 cooperate with the openings 19 to hold the hardened molded plastic within the members.

To use the device the members 5 and 6 are placed together and the prongs 17 and 18, of the handle 9, are inserted into and thru the loops 15 and 16. This firmly holds the members together. The plastic 11 in which the matrix is to be formed is now placed in the receptacle provided between the members. The plastic selected may be plaster-of-Paris or a compound thereof or any other suitable, quick setting, moldable material.

While the material is yet soft the device is placed in the mouth of the patient and pressure is applied to force that portion of the mouth, of which a replica is desired, into the receptacle until it is completely embedded in the moldable material. Before the plastic becomes hardened or set a pen knife blade is inserted in the slots 12, 13 and 14 to establish a dividing line.

The device is retained in the mouth of the patient until the plastic becomes hardened, which will occur within a very few moments, whereupon the prongs 17 and 18 of the handle 9 are moved axially and outwardly from the loops 15 and 16, after which the members 5 and 6 are separated by breaking the moldable material along the established parting line.

Subsequent to this operation the members may be reassembled and the prongs inserted to hold them in place, whereupon the matrix may be filled with a moldable material and when the replica thus made becomes hardened, the plaster casts 11 may be removed therefrom by again separating the members 5 and 6.

Having described my invention what I claim as new and desire to secure by Letters Patent, is:—

1. A dental matrix device having two like members, each provided with an outwardly flaring skirt part and each having an inner parallel flange, said flanges confronting when the members are assembled leaving openings between the flanges for insertion of a parting tool and a handle slidably engaging said members to hold them together.

2. A dental matrix device having two like members each provided with a skirt part and an inner substantially parallel flange, said flanges formed to leave slots or openings therebetween, parallel with the flanges, thru which to describe a parting line by insertion of an instrument or tool therein and a handle having slidable engagement with said members to hold them together.

3. A dental matrix device having two like separable members, each provided with a skirt part and an inner parallel flange, said flanges formed to leave slots or openings therebetween, parallel with the flanges, thru which to describe a parting line by insertion of a flat blade therein and means to hold the members together.

In testimony whereof I hereunto subscribed my name.

LEANDER R. BROWN.